US008640428B2

(12) United States Patent
Naik et al.

(10) Patent No.: US 8,640,428 B2
(45) Date of Patent: Feb. 4, 2014

(54) STRENGTH ENHANCING INSERT ASSEMBLIES

(75) Inventors: Niranjan Krishna Naik, Mumbai (IN); Nageswara Rao Ganji, Dachepalli (IN)

(73) Assignees: Indian Institute of Technology, Bombay, Mumbai (IN); Indian Space Research Organization, Bangalore, Bangalore (IN)

( * ) Notice: Subject to any disclaimer, the term of this patent is extended or adjusted under 35 U.S.C. 154(b) by 702 days.

(21) Appl. No.: 11/628,072

(22) PCT Filed: Sep. 3, 2004

(86) PCT No.: PCT/IN2004/000274
§ 371 (c)(1),
(2), (4) Date: Aug. 7, 2007

(87) PCT Pub. No.: WO2005/106258
PCT Pub. Date: Nov. 10, 2005

(65) Prior Publication Data
US 2008/0008521 A1   Jan. 10, 2008

(30) Foreign Application Priority Data

Apr. 30, 2004   (IN) .......................... 496/MUM/2004

(51) Int. Cl.
*E04C 2/54*   (2006.01)

(52) U.S. Cl.
USPC ...................................... 52/787.1

(58) Field of Classification Search
USPC ............ 52/617, 787.1, 790.1, 793.1, 793.11, 52/799.1, 800.1; 16/433; 403/255; 264/442, 445; 156/73.1
See application file for complete search history.

(56) References Cited

U.S. PATENT DOCUMENTS

| 2,880,830 | A | * | 4/1959 | Rohe | 52/787.12 |
| 3,016,578 | A | * | 1/1962 | Rohe | 264/262 |
| 3,019,865 | A | | 2/1962 | Rohe | |
| 3,271,498 | A | | 9/1966 | Rohe et al. | |
| 3,510,916 | A | * | 5/1970 | Phelan | 425/110 |
| 3,835,906 | A | * | 9/1974 | Dietlein | 411/276 |
| 4,265,688 | A | | 5/1981 | Gorski | |
| 4,502,092 | A | * | 2/1985 | Bannink et al. | 361/218 |

(Continued)

FOREIGN PATENT DOCUMENTS

DE   24 59 608 A   8/1975

OTHER PUBLICATIONS

Bilisik, Kadir; "Multiaxis Three Dimensional (3D) Woven Fabric;" Advances in Modern Woven Fabrics Technology; Jul. 2011.*

(Continued)

*Primary Examiner* — William Gilbert
*Assistant Examiner* — Theodore Adamos
(74) *Attorney, Agent, or Firm* — Holland & Bonzagni, P.C.; Mary R. Bonzagni, Esq.

(57) ABSTRACT

Insert assemblies of high specific strengths to reduce stress concentration at locations where Multidirectional stresses act on sandwich structures have been designed based on mapping stress distribution and failure initiation. The insert assembly comprises of insert (10, 20, 30), potting material (14, 24, 34), core (17, 27, 37), lower face plate (16, 26, 36), Upper faceplate (15, 25, 35) and attachment (13, 23, 33). The insert materials are selected from 2D woven composites, 3D thermoelastic isotropic woven composites, 3D woven composites, 3D woven composites with multiple inserts and 3D functionally gradient woven composites. Specific strengths of inserts (10, 20, 30) of present invention are higher than the inserts of prior art.

27 Claims, 11 Drawing Sheets

Through-the-thickness insert for sandwich structure.

(56) References Cited

U.S. PATENT DOCUMENTS

| | | | |
|---|---|---|---|
| 4,554,196 A * | 11/1985 | Meeker | 428/67 |
| 4,671,470 A * | 6/1987 | Jonas | 244/119 |
| 4,716,067 A | 12/1987 | Moji et al. | |
| 4,729,705 A | 3/1988 | Higgins | |
| 4,941,785 A | 7/1990 | Witten | |
| 5,053,285 A | 10/1991 | Gojny et al. | |
| 5,082,405 A | 1/1992 | Witten | |
| 5,091,246 A * | 2/1992 | Yasui et al. | 442/205 |
| 5,093,957 A * | 3/1992 | Do | 16/2.1 |
| 5,240,543 A * | 8/1993 | Fetterhoff et al. | 156/293 |
| 5,437,750 A * | 8/1995 | Rinse et al. | 156/73.1 |
| 5,451,465 A * | 9/1995 | Garrioch | 428/426 |
| 5,533,693 A * | 7/1996 | Abildskov | 244/131 |
| 5,536,344 A | 7/1996 | Van Dreumel | |
| 5,538,781 A * | 7/1996 | Rao et al. | 442/217 |
| 6,055,790 A | 5/2000 | Lunde et al. | |
| 6,129,122 A * | 10/2000 | Bilisik | 139/11 |
| 6,264,412 B1 * | 7/2001 | Nakamura et al. | 411/352 |
| 6,338,367 B1 * | 1/2002 | Khokar | 139/11 |
| 6,394,722 B1 * | 5/2002 | Kunt et al. | 411/82 |
| 6,872,273 B2 * | 3/2005 | Davies et al. | 156/148 |
| 2002/0050105 A1 * | 5/2002 | McCorkle et al. | 52/127.1 |

OTHER PUBLICATIONS

Magin, Paul F., "Multidirectionally Reinforced Fabrics and Preforms," Engineered Materials Handbook, Composites, 1987, pp. 129-131, vol. 1, ASM International, Metals Park, OH.

McAllister, Lawrence E., "Multidirectionally Reinforced Carbon/Graphite Matrix Composites," Engineered Materials Handbook, Composites, 1987, pp. 915-919, vol. 1, ASM International, Metals Park, OH.

Naik, N. K. and V. K. Ganesh, "Failure Behavior of Plain Weave Fabric Laminates Under On-Axis Uniaxial Tensile Loading: II—Analytical Predictions," Journal of Composite Materials, 1996, pp. 1779-1822, vol. 30.

Naik, N. K. and E. Sridevi, "An Analytical Method for Thermoelastic Analysis of 3D Orthogonal Interlock Woven Composites," Journal of Reinforced Plastics and Composites, 2002, pp. 1149-1191 vol. 21.

Naik, N. K. et al., "Stress and Failure Analysis of 3D Orthogonal Interlock Woven Composites," Journal of Reinforced Plastics and Composites, 2001, pp. 1485-1523, vol. 20.

Shembekar, P. S. and N. K. Naik, "Elastic Behavior of Woven Fabric Composites: II—Laminate Analysis," Journal of Composite Materials, 1992, pp. 2226-2246, vol. 26.

* cited by examiner

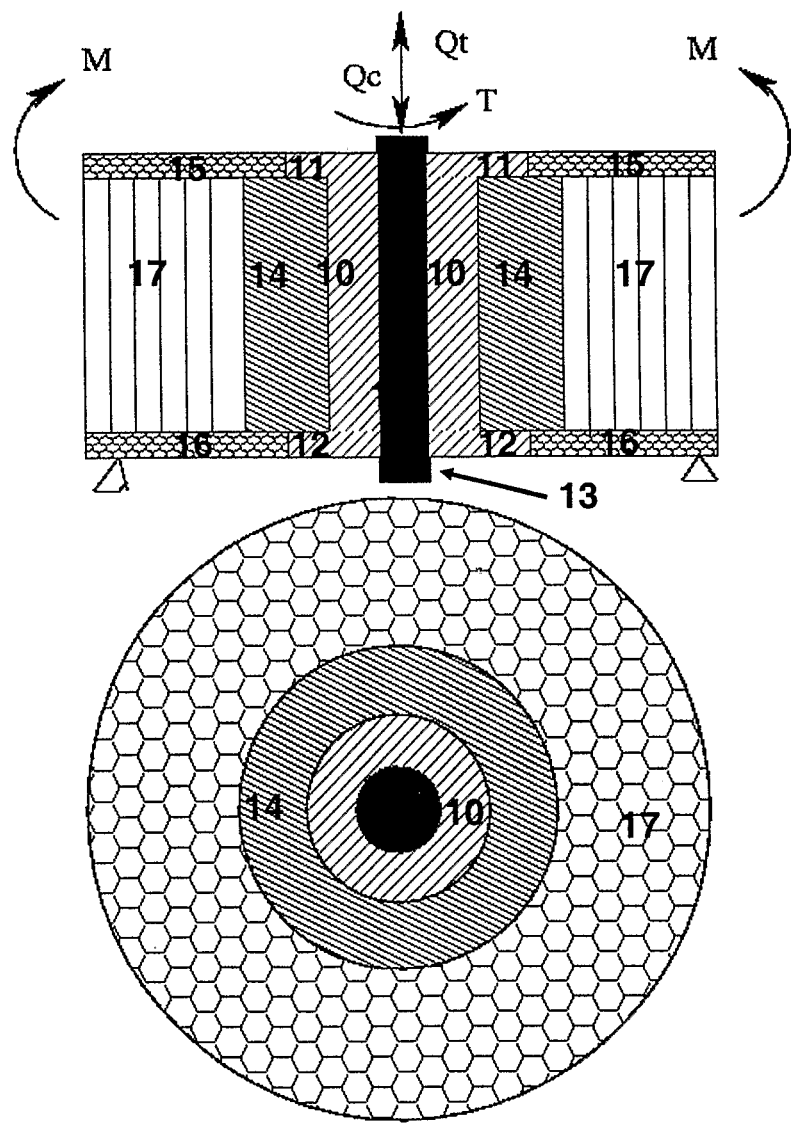
Figure 1: Through-the-thickness insert for sandwich structure.

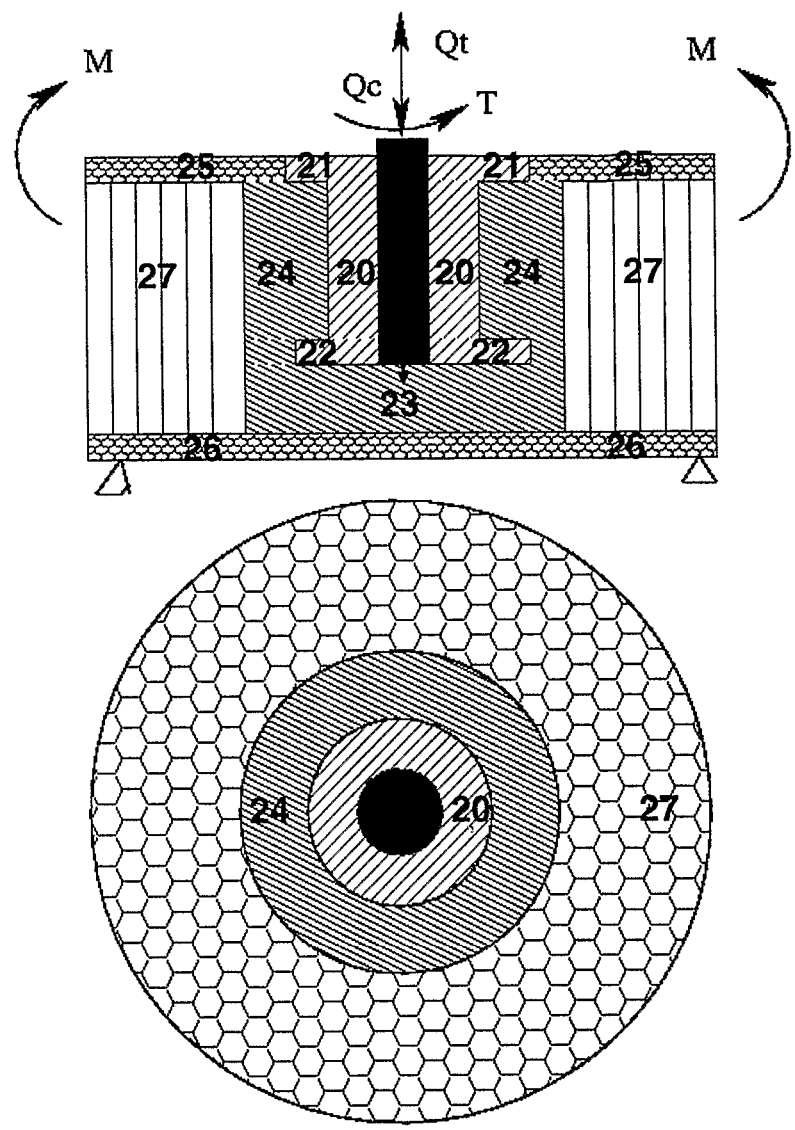
Figure 2: Fully potted insert for sandwich structure.

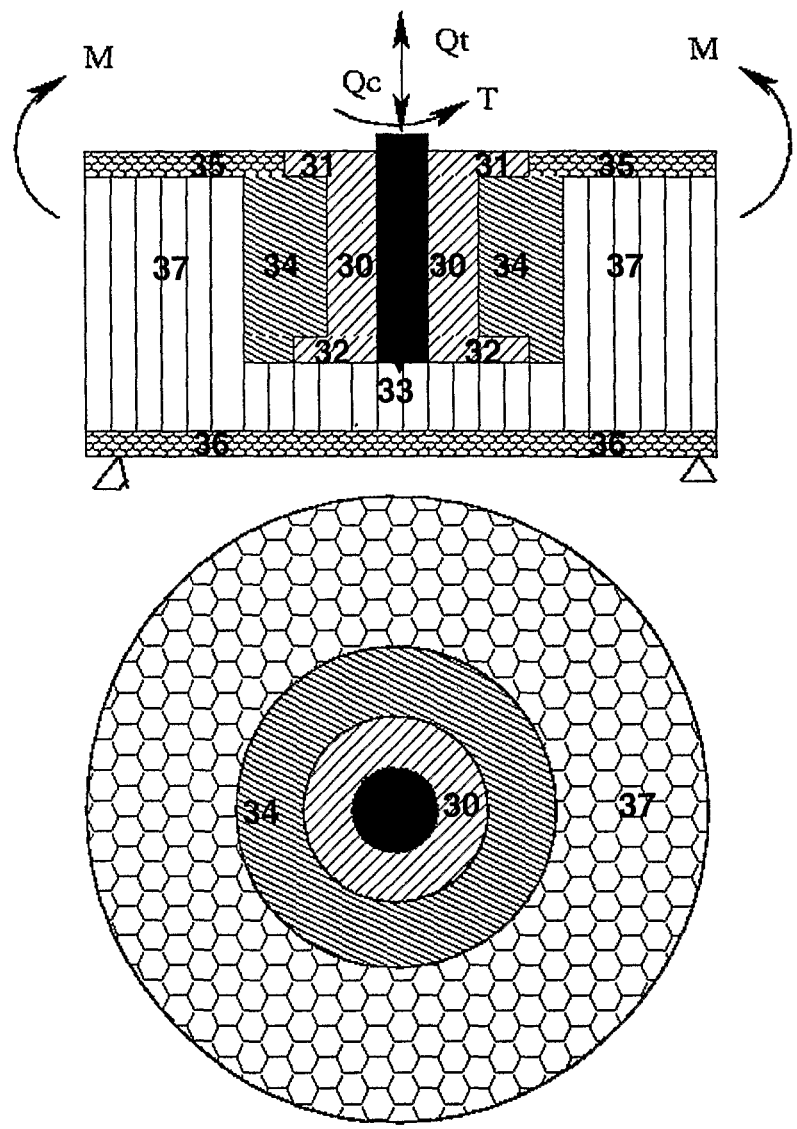
Figure 3: Partially potted insert for sandwich structure.

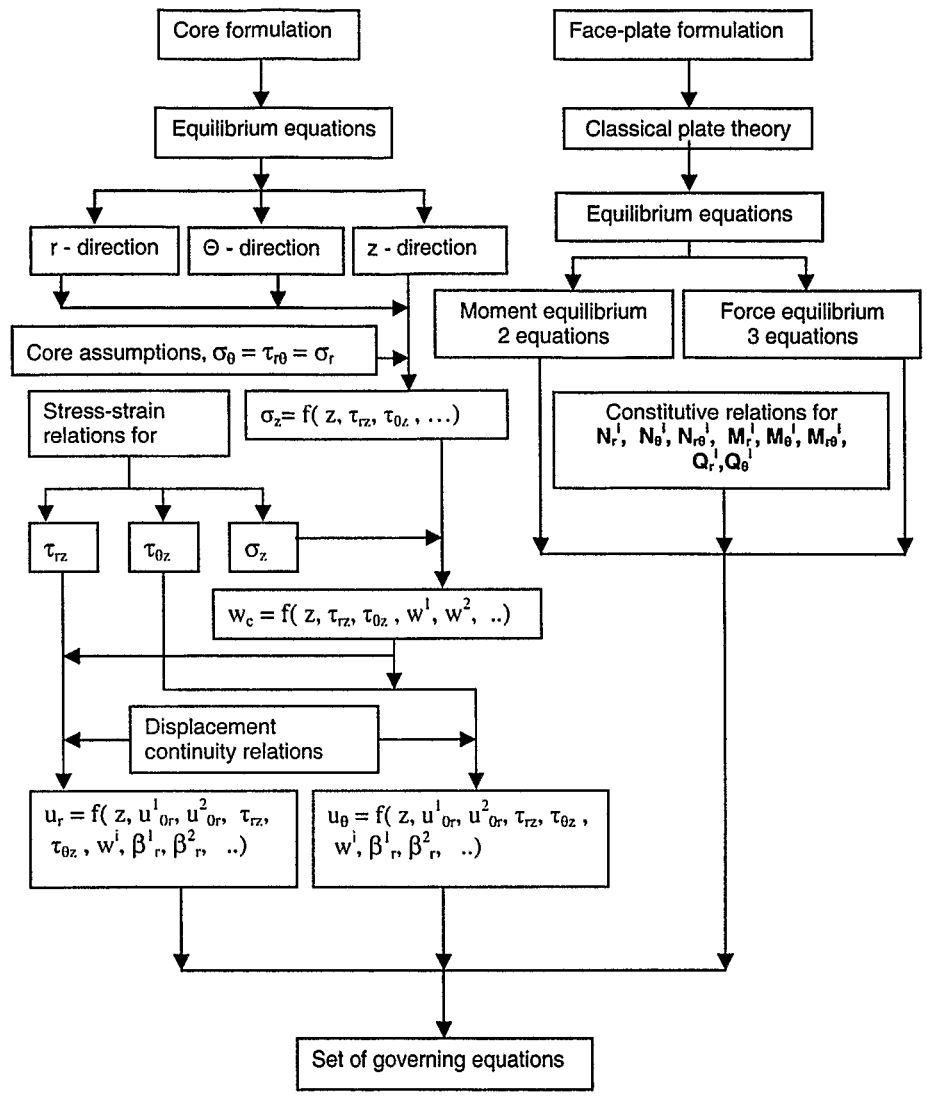
Figure 4: Flow diagram for the analytical formulation procedure.

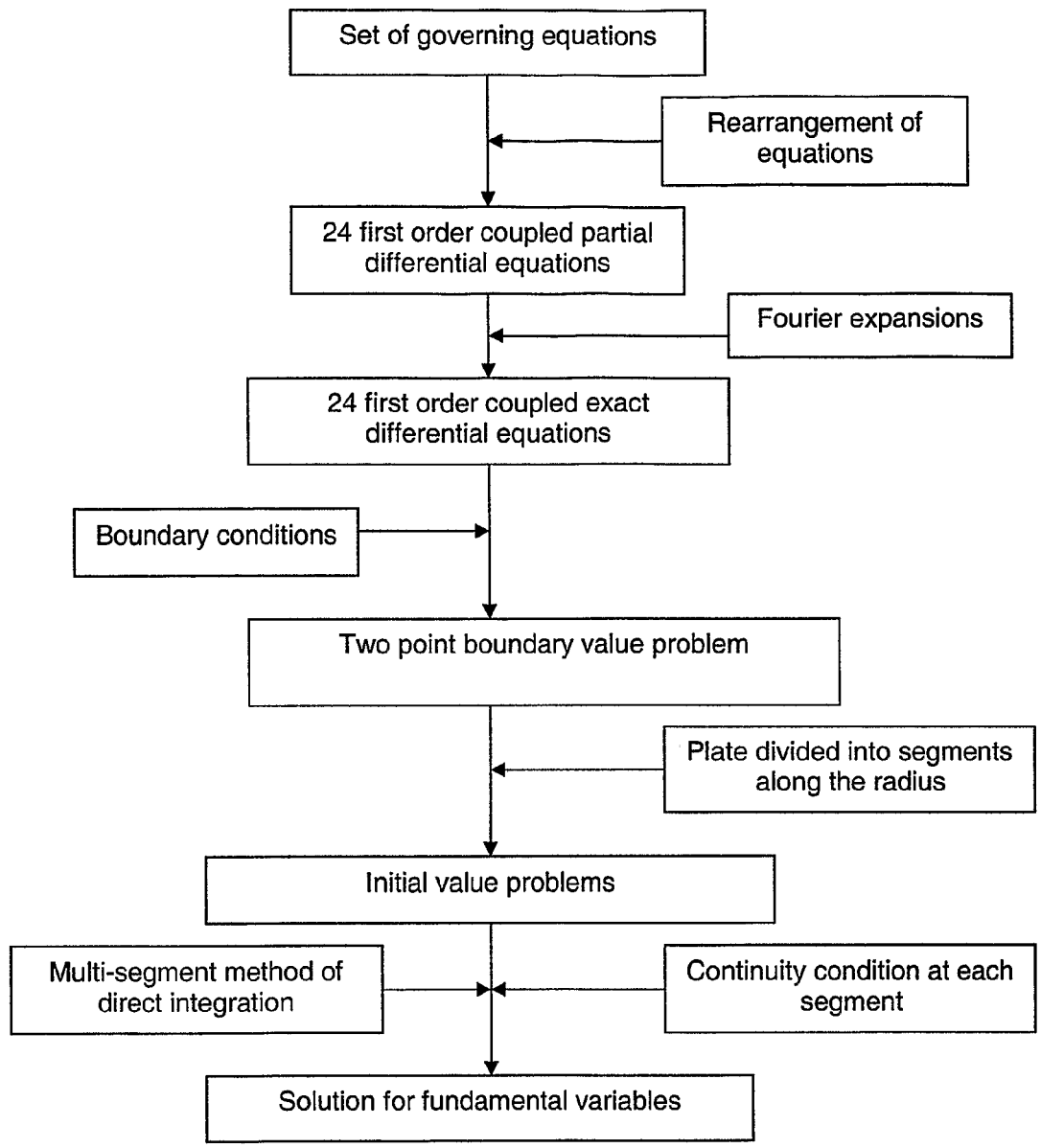
Figure 5: Flow diagram for the solution procedure.

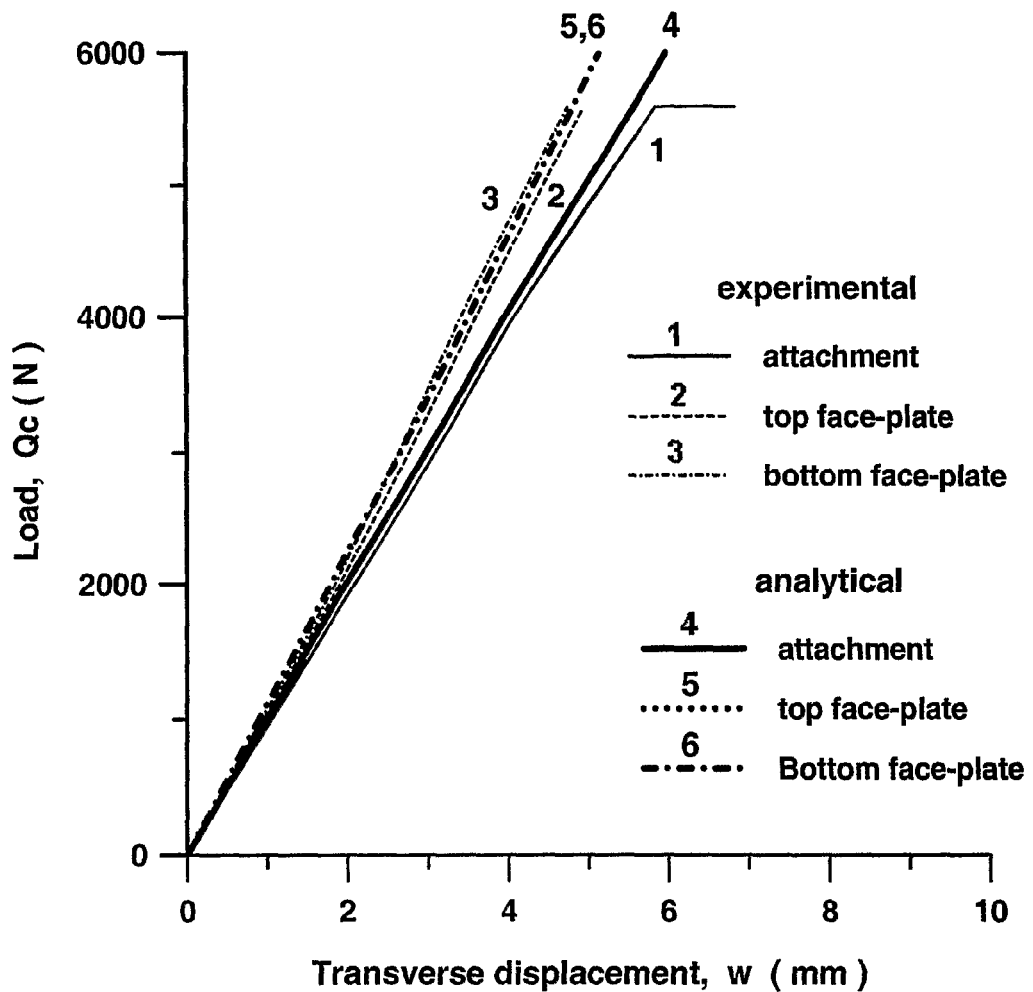
Figure 6: Transverse displacement as a function of compressive load, through-the-thickness aluminum inserts.

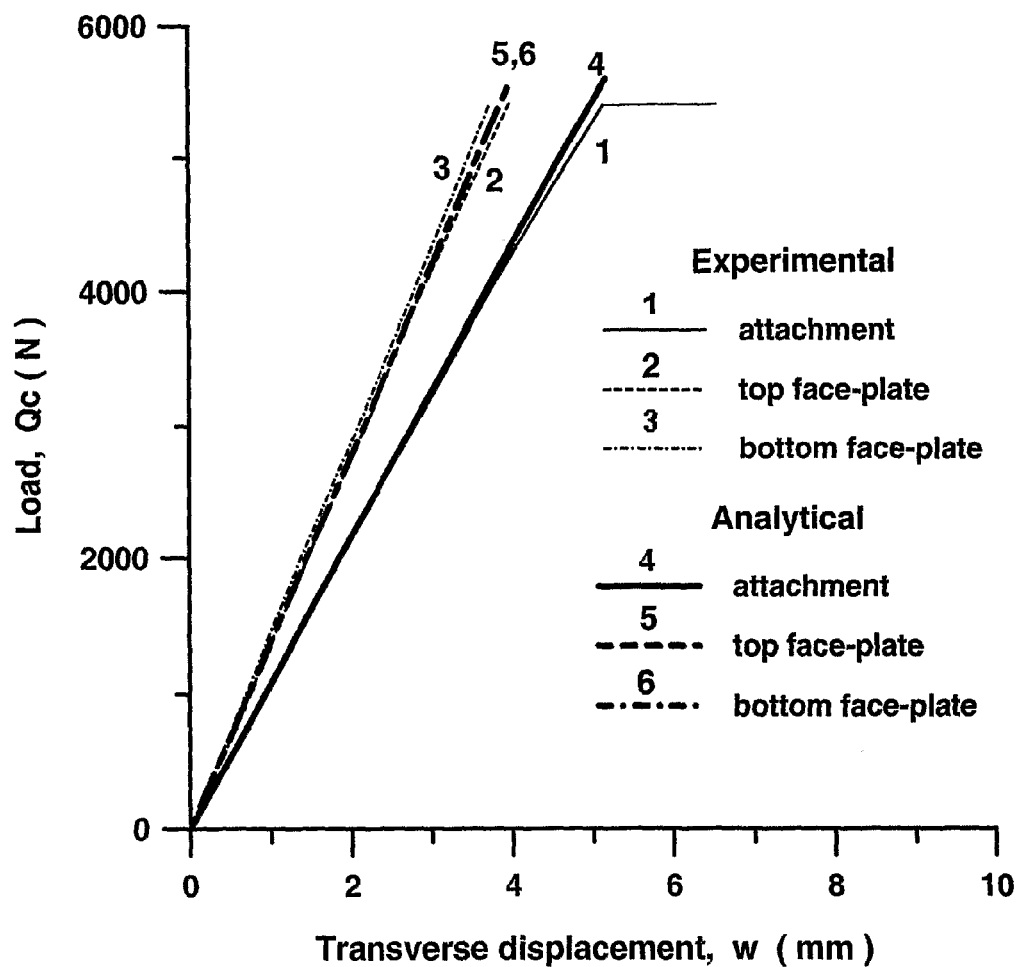
Figure 7: Transverse displacement as a function of compressive load, through-the-thickness 2D woven composite inserts.

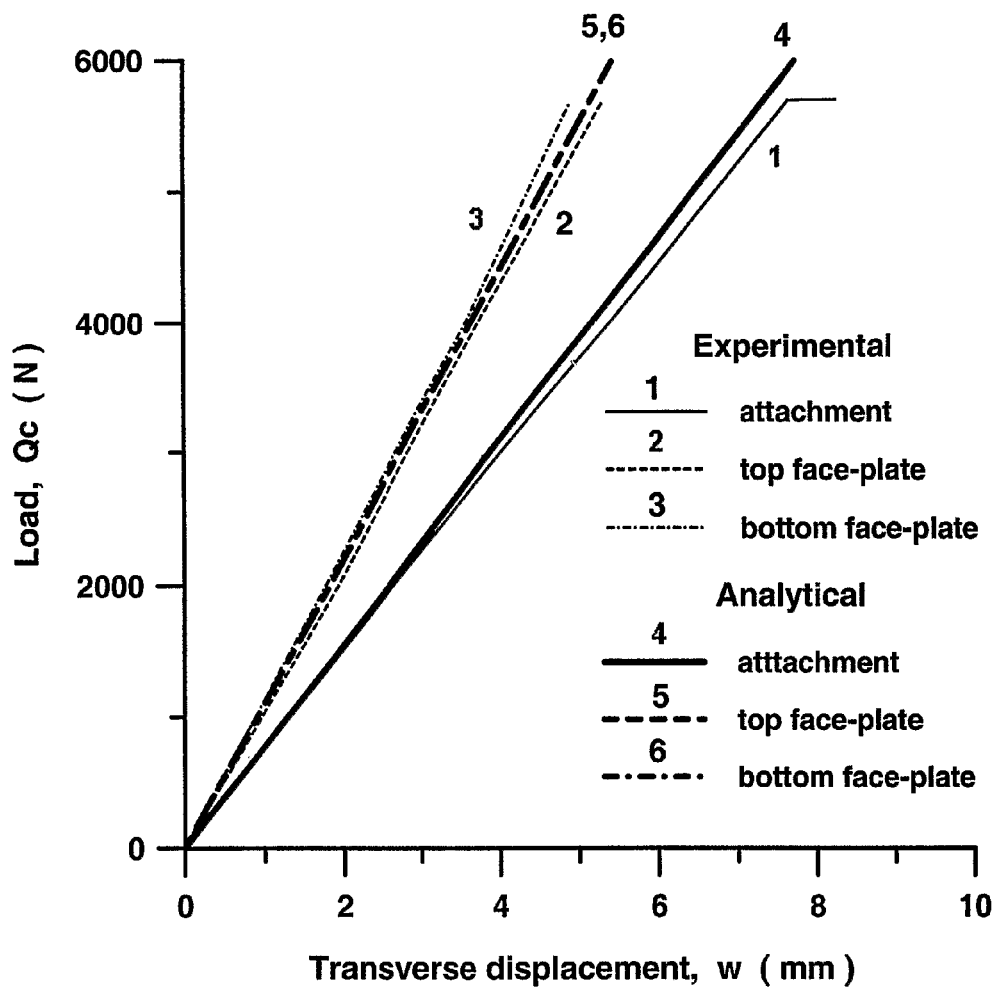
Figure 8: Transverse displacement as a function of compressive load, through-the-thickness 3D woven composite inserts.

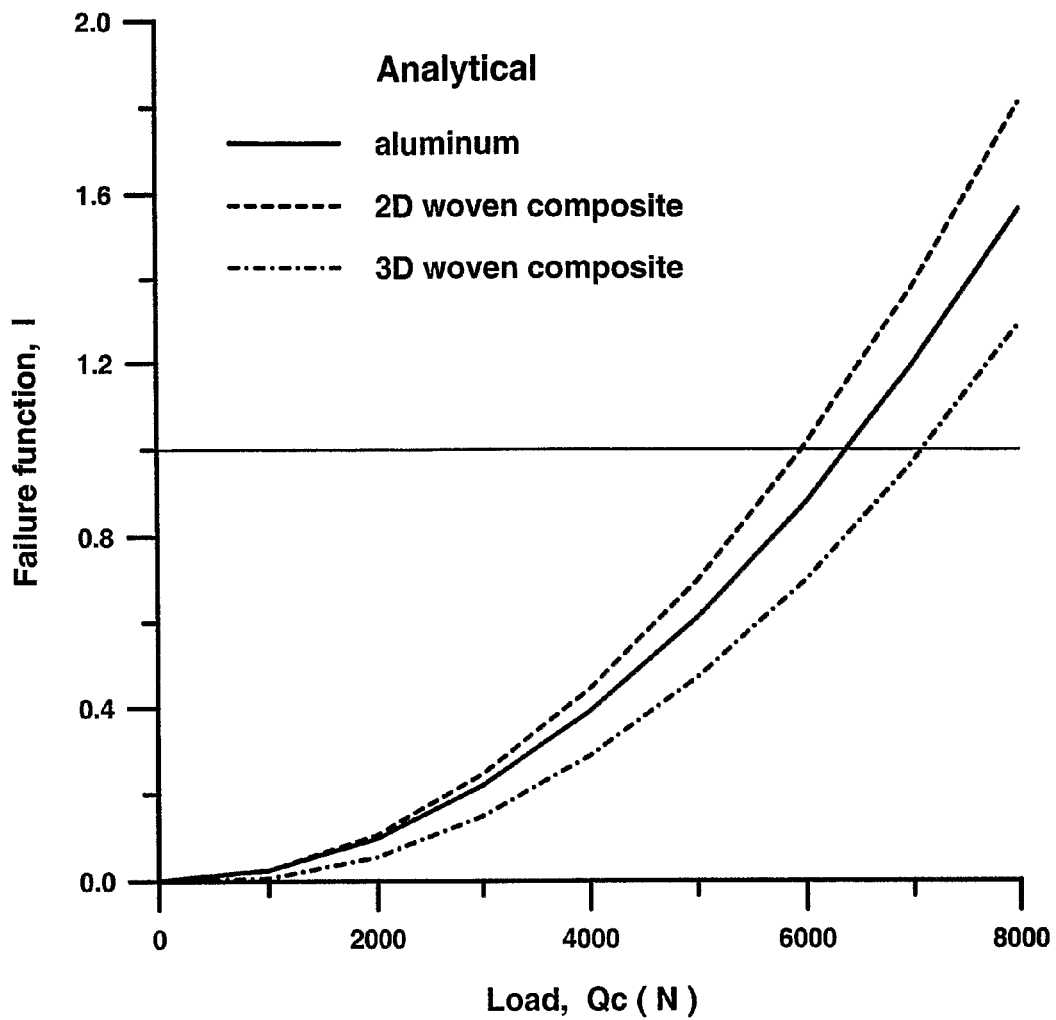
Figure 9: Failure function as a function compressive load: aluminum, 2D woven composite and 3D woven composite inserts.

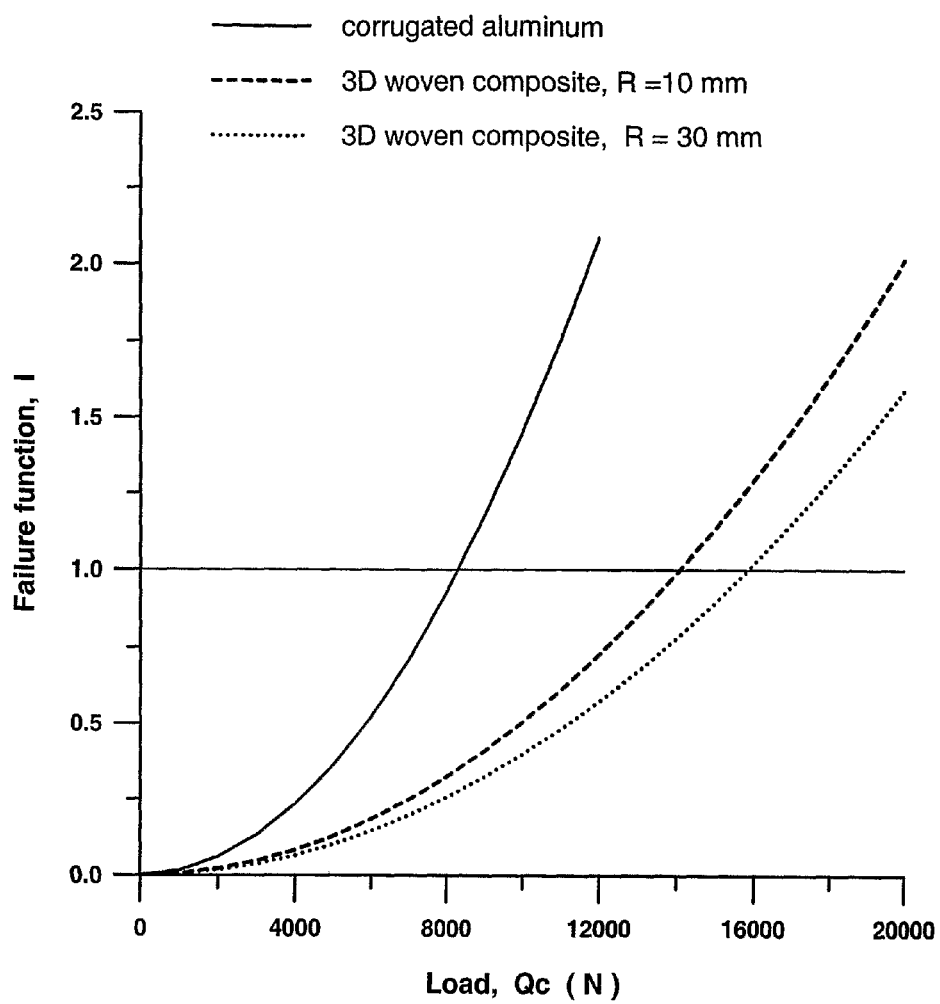
Figure 10: Failure function as a function of compressive load for corrugated aluminum insert (US Patent 5053285), 3D woven composite insert with radius of 10 mm and 3D woven composite insert with radius of 30 mm.

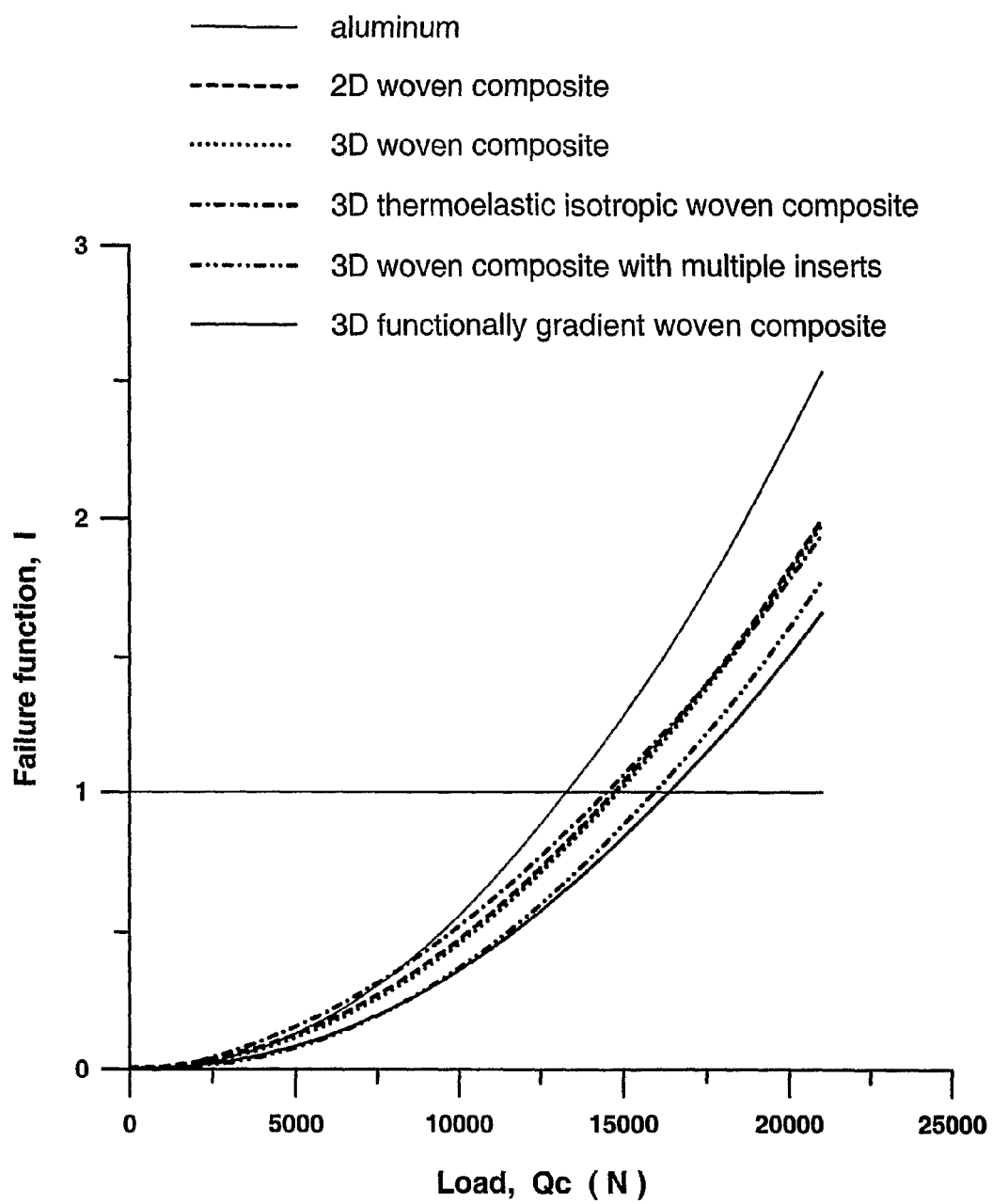
Figure 11: Failure function as a function compressive load for different insert materials.

STRENGTH ENHANCING INSERT ASSEMBLIES

FIELD OF THE INVENTION

This invention relates to insert assemblies of high specific strength to reduce stress concentrations at locations where multidirectional stresses act on sandwich structures designed based on mapping stress distribution and failure initiation.

BACKGROUND OF THE INVENTION

Light weight sandwich structures are used in structural applications such as vehicles, aerospace industry, framework etc. because of their superior strength and stiffness properties along through-the-thickness direction under bending loads. The use of inserts is essential to strengthen the sandwich structures to withstand localized loads. Further, when the external members or sub-structures are attached to sandwich structures, inserts become a necessity.

The specific strength of an insert assembly is a ratio of load at failure initiation to weight of the insert assembly which should be as high as possible to achieve effective utilization of sandwich structures with inserts. In practice, these inserts are made of aluminum alloys, other metals/alloys etc. High density of metals/alloys increases the weight of insert assembly resulting in undesirable reduction in the specific strength. Further, the difference in material properties at the interface between the insert and the potting material such as resin leads to high stress concentration at the interfaces between insert and potting material and between potting material and core.

U.S. Pat. No. 5,240,543 discloses a basic procedure to seat a fastener insert in a honeycomb panel. A fastener insert made of alloy attached to a mounting fixture is inserted into a hole drilled in a honeycomb panel. The mounting fixture has a rod with a disc at an end descending from a base and a chimney ascending from the base. Two bores are located in the base and are enclosed by the chimney. The mounting fixture base overlaps the head of the fastener insert which has two bores in the head. The bores in the fastener insert head are aligned with bores in the base of the mounting fixture. Epoxy is inserted into one of the bores in the base of the mounting fixture continuously until it returns out of the second bore. The epoxy is allowed to cure and thereafter the mounting fixture is removed by a turning motion. Though this patent describes the method of installation of inserts into honeycomb sandwich structures, it does not address the issue of minimization of the insert assembly weight and a means to increase specific strength.

U.S. Pat. No. 5,082,405 and U.S. Pat. No. 4,941,785 disclose the geometry of the inserts and the method to attach the insert to the attachment. In this insert assembly, epoxy resin is used as potting compound. The insert is a metallic member, made of stainless steel, aluminum alloy, and carbon steel. However, a metal insert increases the weight of the insert assembly resulting in reduction of specific strength.

U.S. Pat. No. 5,053,285 discloses the method and apparatus for making corrugated aluminum inserts. These inserts are made from aluminum foil strips by passing the strips through the corrugating device. Though the weight of such inserts is less, stresses at the interfaces of different materials increase because the elastic properties of corrugated aluminum inserts are less resulting in higher stress concentrations.

U.S. Pat. No. 6,055,790 discloses construction of an insert wherein the conduction and radiation are improved through the inserts. To improve the heat transfer rate, one of the face-plates is made of metal sheet. The insert material is aluminum alloy. In this arrangement, a higher thermally conducting path is provided from one side of the insert assembly to the other side. However, these inserts suffer from the deficiency such that the surrounding potting material made of resin which is not a good conductor of heat that leads to thermal gradient along the radial direction. This causes higher thermal stresses in the sandwich structure. The use of metal for face-plate increases weight of insert assembly thereby decreasing the specific strength.

U.S. Pat. No. 3,271,498 discloses an improved method of installation of inserts. However it does not address the issue of weight of an insert assembly.

A method of fabricating a honeycomb core structure with embedded fastener is disclosed in U.S. Pat. No. 4,716,067. The bonding material is epoxy resin. The method comprises laying down a first nonmetallic synthetic layer, which may be cured or uncured. Bonded to the first nonmetallic synthetic layer is a honeycomb core layer into which one or more flush head fasteners are inserted into holes in the honeycomb core that have an indentation at one end configured to mate with the underside of the head of a flush head fastener. Bonding is accomplished by priming the walls of the honeycomb core layer adjacent the surfaces of the layer, and the fastener, with a suitable primer, preferably before the fastener is installed, and, coating one of the surfaces of the first nonmetallic synthetic layer with a suitable adhesive before joining the first nonmetallic synthetic layer to the surface of the honeycomb core layer containing the head of the flush head fastener. Thereafter, the cells of the honeycomb core that surround the fastener are filled with a potting material. Then, a second nonmetallic synthetic layer is bonded to the surface of the honeycomb core remote from the surface to which the first nonmetallic synthetic layer is bonded. There are several drawbacks of this method and insert assembly. The fasteners are made of an alloy. The density of the alloys used is more compared to the composites. Significantly high interfacial stresses develop between the alloy insert and the potting resin material. Further, this patent describes the method of installation of inserts into honeycomb sandwich structures. It does not address the issue of enhancing the specific strength of insert assemblies.

The shortcomings in prior art vis-a vis use of inserts in sandwich structure are Use of metal for inserts which leads to decrease in specific strength of the insert assembly.

Though geometry of the inserts and different methods of installation of these inserts into sandwich structures is addressed, the issue of minimization of the insert assembly weight and a means to increase specific strength of insert assembly has not been addressed.

There are no methods of reliably mapping stress distribution and prediction of failure initiation in sandwich structures with diverse geometrical configurations.

SUMMARY OF THE INVENTION

The main object of the invention is to provide insert assemblies of high specific strength to reduce stress concentrations at locations where multidirectional stresses act on sandwich structures based on mapping stress distribution and failure initiation in sandwich structures.

It is another objective to provide inserts of composite materials.

It is yet another object of the invention to reliably map stress distribution in sandwich structures with insert assemblies.

It is yet another object of the invention to reliably to select diverse geometrical configurations and materials by mapping stress distribution and obtaining failure initiation.

It is yet another object of the invention to provide insert assemblies with through-the-thickness, fully potted and partially potted geometrical configurations.

It is yet another object of this invention to explore the use of
- 2D composites
- 3D thermo elastic isotropic woven composites
- 3D woven composites
- 3D woven composites with multiple inserts,
- 3D functionally gradient woven composites as inserts and their combination for insert assemblies Thus in accordance, the invention of the insert assembly comprises of:
- insert
- potting material
- core
- lower face-plate
- upper face-plate
- attachment using insert assemblies wherein insert materials are selected from
- 2D composites
- 3D thermo elastic isotropic woven composites
- 3D woven composites
- 3D woven composites with multiple inserts
- 3D functionally gradient woven composites as inserts and their combination for the insert assemblies wherein the diverse geometrical configurations and materials are selected by mapping stress distribution and obtaining failure initiation.

DETAILED DESCRIPTION OF THE INVENTION

Features and advantages of this invention will become apparent in the following detailed description and preferred embodiments with reference to the accompanying drawings.

FIG. 1 Through-the-thickness inserts

FIG. 2 Fully potted inserts

FIG. 3 Partially potted inserts

FIG. 4 Flow diagram for the analytical formulation procedure

FIG. 5 Flow diagram for the solution procedure

FIG. 6 Graph depicting transverse displacement as a function of compressive load, through-the-thickness aluminum inserts FIG. 7 Graph depicting transverse displacement as a function of compressive load, through-the-thickness 2D woven composite inserts FIG. 8 Graph depicting transverse displacement as a function of compressive load, through-the-thickness 3D woven composite inserts FIG. 9 Graph depicting failure function as a function of compressive load: aluminum, 2D woven composite and 3D woven composite inserts FIG. 10 Graph depicting failure function as a function of compressive load for corrugated aluminum insert (US 5053285), 3D woven composite insert with radius of 10 mm and 3D woven composite insert with radius of 30 mm FIG. 11 Graph depicting failure function as a function of compressive load for different insert materials

GEOMETRICAL CONFIGURATIONS

The geometrical configurations are
- a) Through-the-thickness insert configuration
- b) Fully potted insert configuration
- c) Partially potted insert configuration a) Through-the-Thickness Insert Configuration FIG. 1 shows a schematic of the through-the-thickness insert assembly configuration. Insert 10 is cylindrical in shape with flanges 11, 12 that are integral to provide shear resistance. The inserts are strongly attached with attachment 13 with bonding/threading. The localized external loads are applied to sandwich structures through the attachment 13. The insert-attachment assembly is held in sandwich structure by using potting materials 14 as shown in FIG. 1. The potting materials are different types of resins. Reinforcement is added to the resins to increase the stiffness and strength. Upper face-plate 15, lower face-plate 16 and core 17 are the other components of the insert assembly.

In one of the embodiments of through-the-thickness insert assembly configuration, material of insert is 2D composite.

In another embodiment of through-the-thickness insert assembly configuration, material of insert is 3D thermoelastic isotropic woven composite.

In yet another embodiment of through-the-thickness insert assembly configuration, material of insert is 3D woven composite.

In another embodiment of through-the-thickness insert assembly configuration, material of insert is 3D woven composite with multiple inserts.

In yet another embodiment of through-the-thickness insert assembly configuration, material of insert is 3D functionally gradient woven composite.

In another embodiment of through-the-thickness insert assembly configuration, material of insert is a combination of the above mentioned.

b) Fully Potted Insert Configuration

FIG. 2 shows schematic of the fully potted insert assembly configuration. Insert 20 is cylindrical in shape with flanges 21, 22 that are integral to provide shear resistance. The inserts are strongly attached with attachment 23 with bonding/threading. The localized external loads are applied to sandwich structures through the attachment 23. The insert-attachment assembly is held in sandwich structure by using potting materials 24 as shown in FIG. 2. The potting materials are different types of resins. Reinforcement is added to the resins to increase the stiffness and strength. Upper face-plate 25, lower face-plate 26 and core 27 are the other components of the insert assembly.

In one of the embodiments of fully potted insert assembly configuration, material of insert is 2D composite.

In another embodiment of fully potted insert assembly configuration, material of insert is 3D thermoelastic isotropic woven composite.

In yet another embodiment of fully potted insert assembly configuration, material of insert is 3D woven composite.

In another embodiment of fully potted insert assembly configuration, material of insert is 3D woven composite with multiple inserts.

In yet another embodiment of fully potted insert assembly configuration, material of insert is 3D functionally gradient woven composite.

In another embodiment of fully potted insert assembly configuration, material of insert is a combination of the above mentioned.

c) Partially Potted Insert Configuration

FIG. 3 shows schematic of the partially potted insert assembly configuration. Insert 30 is cylindrical in shape with flanges 31, 32 that are integral to provide shear resistance. The inserts are strongly attached with attachment 33 with bonding/threading. The localized external loads are applied to sandwich structures through the attachment 33. The insert-attachment assembly is held in sandwich structure by using potting materials 34 as shown in FIG. 3. The potting materials are different types of resins. Reinforcement is added to the resins to increase the stiffness and strength. Upper face-plate 35, lower face-plate 36 and core 37 are the other components of the insert assembly.

In one of the embodiments of partially potted insert assembly configuration, material of insert is 2D composite.

In another embodiment of partially potted insert assembly configuration, material of insert is 3D thermoelastic isotropic woven composite.

In yet another embodiment of partially potted insert assembly configuration, material of insert is 3D woven composite.

In another embodiment of partially potted insert assembly configuration, material of insert is 3D woven composite with multiple inserts.

In yet another embodiment of partially potted insert assembly configuration, material of insert is 3D functionally gradient woven composite.

In another embodiment of partially potted insert assembly configuration, material of insert is a combination of the above mentioned.

Insert Materials

The insert materials are selected from
I) 2D woven composites
II) 3D woven composites
III) 3D thermoelastic isotropic woven composites
IV) 3D functionally gradient woven composites
V) 3D woven composite with multiple inserts I) 2D Composites 2D composites are those in which only in-plane reinforcements are provided. In laminated composites made of unidirectional layers, different layers are oriented accordingly to achieve required elastic and strength properties. In woven fabric composites, reinforcements are provided along mutually perpendicular directions in the same layer by the process of weaving. Weaving is the process in which the woven fabric is formed by interlacing warp and fills (weft) yarns in regular sequence of under and over. Based on the sequence of placing the yarns under and over, the woven fabrics are classified into plain, twill and satin. Specifically, one under and one over sequence is the plain weave.

II) 3D Woven Composites 3D woven performs are fully integrated continuous fiber assembly having multiaxial in-plane and out of plane fiber orientations. In such preforms, reinforcement is also provided in through-the-thickness direction in addition to planar directions. These preforms are made using the process of 3D weaving. Based on the weave pattern, the preforms can be orthogonal interlock woven or angle interlock woven. Further, it can be classified into through-the-thickness woven and layer to layer woven. Using the 3D preforms and resin transfer molding, 3D composites are made. 3D composites are 3D orthotropic and macrospecically homogeneous materials. Such materials are characterized by 9 elastic properties and 9 strength properties.

III) 3D Thermoelastic Isotropic Woven Composites

These are a class of 3D composites with special characteristics. For such materials, elastic and thermal properties are the same along all the directions. In other words, such composites are thermoelastically isotropic.

IV) 3D Functionally Gradient Woven Composites 3D functionally gradient woven composites are the ideal materials for making inserts. In a typical insert assembly with single insert material, there is a significant difference in material elastic properties between insert and potting material and potting material and core. Through-the-thickness elastic properties of insert, potting material and core are of the order of 40 GPa, 2.5 GPa and 0.31 GPa respectively. This leads to higher stress concentrations at the interfaces between attachment and insert, insert and potting material, potting material and core. An ideal way of reducing the stress concentrations and increasing the specific strength is to use a material system for inserts with gradually varying elastic and strength properties along the radial direction. Such a material is called functionally gradient. A composite insert made of functionally gradient material has through-the-thickness elastic properties nearly matching with that of the attachment along the inner circumference and through-the-thickness elastic properties matching with that of potting material along the outer circumference. Consequently, elastic properties of the insert with such a configuration would be higher along the inner circumference and lower along the outer circumference and varying radially in a functionally gradient way. For such insert materials, the stress concentrations at the interfaces would be minimum leading to higher specific strength.

V) 3D Woven Composites with Multiple Inserts

Inserts made of 3D woven composite with multiple inserts is a class of inserts made of 3D functionally gradient woven composite. In this insert, the elastic and strength properties are not varied gradually along the radius from the inner circumference to the outer circumference. Instead, the elastic and strength properties are varied in a stepped manner. This amounts to using multiple inserts instead of a single insert. If the material properties are varied in three steps, there would be three different 3D woven composites. These three different 3D woven composites are referred as material 1, material 2 and material 3.

A Novel Method to Reliably Map Stress Distribution and Predict Failure Initiation in Sandwich Structures with Inserts Under Localized Through-the-Thickness Tensile/Compressive Loading A novel method is described to map stress distribution in sandwich structures with inserts under localized through-the-thickness tensile/compressive loading. The core is relatively thick and compressible whereas the face-plates are relatively thin. The core is analyzed using higher-order sandwich plate theory whereas the face-plates are analyzed using classical plate theory. The behavior of the sandwich structure is represented using a set of 24 governing differential equations. For the geometry of the insert assembly and the loading conditions considered the boundary conditions are specified. In this case, there are 24 boundary conditions. Using the differential equations and the set of 24 boundary conditions, the deformation behavior and stress state within the insert assembly are calculated. Specifically, the following quantities are determined: transverse displacement of top and bottom face-plates ($w^1$ and $w^2$), transverse shear stress ($\tau_{rz}$), mid-plane radial displacement of top face-plate ($u_{o1}^1$), mid-plane circumferential displacement of top face-plate ($v_{o1}^1$). The novel method to reliably map stress distribution is described in the form of flow diagrams in FIGS. 4 and 5.

The input parameters are: geometry of the insert assembly, elastic properties of different materials used for making the insert assembly and the loading condition.

This novel method enables to map the following parameters reliably:
- transverse and radial displacements of the insert assembly
- normal and shear stress components throughout the insert assembly The final governing equations are:

The transverse displacement of the core material, $$w_c = \frac{1}{S_1}\left(k_1\left(\frac{z^2}{2}\right) + \frac{w^1 - w^2}{c}S_1 \times z\right) + \frac{w^1 + w^2}{2} - \frac{k_1}{S_1}\left(\frac{c^2}{8}\right) \quad (1)$$

Through-the-thickness normal stress in the core material, $$\sigma_z = k_1 \times z + \frac{w^1 - w^2}{c} \times S_1 \quad (2)$$

Radial displacement in the core material, $$u_c = u_{01}^1 + \frac{1}{2}\left(\frac{\partial w^1}{\partial r}\right)\left(t_1 - \frac{z^2}{c} - z + \frac{3c}{4}\right) + \quad (3)$$

$$\frac{\tau_{rz}}{C_{66}}\left(z - \frac{c}{2}\right) + \frac{1}{2}\left(\frac{z^2}{c} - z + \frac{c}{4}\right)\frac{\partial w^2}{\partial r} +$$

$$\left(\frac{1}{2S_1}\right)\left(\frac{\partial^2 \tau_{rz}}{\partial r^2} + \frac{1}{r}\frac{\partial \tau_{rz}}{\partial r} - \frac{\tau_{rz}}{r^2} + \frac{1}{r}\frac{\partial^2 \tau_{\theta z}}{\partial r \partial \theta} - \frac{1}{r^2}\frac{\partial \tau_{\theta z}}{\partial \theta}\right) \times \left(\frac{z^3}{3} - \frac{c^2 z}{4} + \frac{c^3}{12}\right)$$

Circumferential displacement in the core material, $$v_\theta v_{0\theta}^1 + \frac{\partial w^1}{\partial r}\left(\frac{1}{2r}\right)\left(t_1 - \frac{z^2}{c} - z + \frac{3c}{4}\right) + \quad (4)$$

$$\frac{\partial w^2}{\partial \theta}\left(\frac{1}{2r}\right)\left(\frac{z^2}{c} - z + \frac{c}{4}\right) + \frac{\tau_{\theta z}}{C_{55}}\left(z - \frac{c}{2}\right) +$$

$$\frac{1}{S_1}\frac{1}{2r}\left(\frac{\partial^2 \tau_{rz}}{\partial r \partial \theta} + \frac{1}{r}\frac{\partial \tau_{rz}}{\partial \theta} + \frac{1}{r}\frac{\partial^2 \tau_{\theta z}}{\partial \theta^2}\right)\left(\frac{z^3}{3} - \frac{c^2 z}{4} + \frac{c^3}{12}\right) \text{ here,}$$

$$k_1 = -\left(\frac{\partial \tau_{rz}}{\partial r} + \frac{1}{r}\frac{\partial \tau_{\theta z}}{\partial \theta} + \frac{\tau_{rz}}{r}\right)$$

$$S_1 = \left(C_{13}\left(\frac{C_{12} \times C_{23} - C_{13} \times C_{22}}{C_{11} \times C_{22} - C_{12}^2}\right) + C_{23}\left(\frac{C_{11} \times C_{23} - C_{12} \times C_{13}}{C_{12}^2 - C_{11} \times C_{22}}\right) + C_{33}\right)$$

All the $C_{ij}$ are stiffness constants and are calculated using elastic properties of the material.

The normal and shear stress distribution within the entire insert assembly can be obtained using this novel method. The induced stress state can lead to initiation of failure within insert assembly. Initiation of failure is characterized using the following through-the-thickness quadratic interaction failure criterion.

$$\left(\frac{\sigma_z}{Z_t}\right)^2 + \left(\frac{\tau_{rz}}{S_{rz}}\right)^2 + \left(\frac{\tau_{\theta z}}{S_{\theta z}}\right)^2 = I \quad (5)$$

Here, $\sigma_z$—Through-the-thickness normal stress $\tau_{rz}, \tau_{\theta z}$—Transverse shear stresses $Z_t$—Through-the-thickness normal strength $S_{rz}, S_{\theta z}$—Transverse shear strengths I—Failure function Failure function, I=1 indicates initiation of failure.

In the above method the stress distribution is mapped and failure initiation is obtained in steps comprising Establishing frame of reference for sandwich structures with inserts Applying equilibrium equations, continuity conditions and constitutive relations of the core and the face-plates to obtain $24^{th}$ order partial differential equation consisting of fundamental variables such as Mid-plane radial displacement of upper and lower face-plates in radial direction, Mid-plane circumferential displacement of upper and lower face-plates in circumferential direction, Transverse displacement of upper and lower face-plates, Derivative of transverse displacement with respect to radius of insert assembly of upper and lower face-plates, Derivative of transverse displacement with respect to circumferential direction of upper and lower face-plates and divided by radius of insert assembly, Bending moment resultant of upper and lower face-plates in radial direction, Twisting moment resultant in the plane of radial and circumferential coordinates of upper and lower face-plates, In-plane normal stress resultant in radial direction of upper and lower face-plates, In-plane normal stress resultant in the plane of radial and circumferential coordinates of upper and lower face-plates, In-plane shear stress resultant in the plane of radial and circumferential coordinates of upper and lower face-plates, Transverse shear stress component of core in the plane of radial and circumferential coordinates, Shear stress in circumferential direction on a plane perpendicular to through-the-thickness direction in the core, Derivative of shear stress in circumferential direction on a plane perpendicular to through-the-thickness direction in the core with respect to radius of the insert assembly, Derivative of transverse shear stress component of core in the plane of radial and circumferential coordinates with respect to radius of the insert assembly, and further to obtain 24 first order coupled exact differential equations Applying boundary conditions to the 24 first order coupled exact differential equations and solving two point boundary value problem to obtain stresses (equation 2), displacements (equations 1, 3, 4) and failure initiation (equation 5)

wherein, frame of reference is established based on i. The attachment is infinitely rigid ii. Insert and potting material are an integral part of the core for mathematical formulation iii. In-plane shear stress and in-plane normal stresses are neglected in the core material iv. Core material is flexible in nature v. Effective shear modulus of the honeycomb core is considered in modeling vi. Insert assembly is circular in shape vii. Interaction between two adjacent inserts is negligible viii. Interaction between the insert and the honeycomb core along the circumference of the insert assembly is negligible ix. Face-plates are homogeneous and isotropic/quasi-isotropic
x. Classical plate theory is applicable for the analysis of the face-plates and wherein, the steps to obtain 24 first order coupled exact differential equations involve
   a. Representing the behavior of the sandwich structure with an insert assembly using a set of plurality of equations based on equilibrium equations, constitutive relations and continuity conditions
   b. Combining the core and face-plate equations to obtain $24^{th}$ order governing partial differential equation with 24 unknown fundamental variables
   c. Rearranging the governing partial differential equation to 24 first order coupled partial differential equations in terms of 24 fundamental variables, their derivatives with respect to circumferential angle and radius using plurality of equations
   d. Eliminating the dependency of derivatives of circumferential angle in the 24 first order coupled partial differential equations using Fourier expansions to convert them into 24 first order coupled exact differential equations and wherein, stresses, displacements and failure initiation are obtained by
   i. Specifying 24 boundary conditions with respect to 24 first order coupled exact differential equations with 12 boundary conditions at the interface of attachment and insert and remaining at simply supported outer edge of the insert assembly.
   ii. Constituting a two point boundary value problem comprising 24 first order coupled exact differential equations and boundary conditions
   iii. Converting two point boundary value problem into a series of initial value problems by dividing the sandwich structure into a number of segments along radial direction
   iv. Solving the series of initial value problems numerically using multi-segment method of direct integration for 24 fundamental variables at each segment using continuity conditions between two adjacent segments to determine the stresses and displacements throughout the insert assembly for given loading conditions
   v. Obtaining the failure initiation within the insert assembly using quadratic failure criterion and the corresponding failure initiation load
   vi. Obtaining transverse, radial and circumferential displacements (equations 1, 3, 4), through-the-thickness normal (equation 2) and shear stress components in the core, induced normal stress resultants, induced shear stress resultants and induced bending moment resultants in the face-plates and specific strength of the insert assembly based on geometrical, mechanical and physical properties of the insert assembly and loading conditions.

The method described above was used to obtain geometrical configuration of the inserts and the displacement and failure initiation were predicted and experimentally verified. The present work establishes the superiority of the inserts of the present invention over inserts of prior art.

EXAMPLE 1

Experimental Studies

Fabrication of Through-the-Thickness Insert Assembly

The insert assembly comprises of six constituents. They are: insert, potting material, foam core, lower face-plate, upper face-plate and the attachment. Lower face-plate and the upper face-plate are made of woven fabric E glass and epoxy resin using matched-die molding technique. The core is made of polyurethane foam. The attachment is made of mild steel. The material used for composite inserts is glass. The potting material is epoxy resin. Three insert assemblies were constructed using the above with aluminum, 2D woven composite and 3D woven composite as insert materials.

Measurement of load, displacements and failure initiation

The insert assembly was placed on a support ring and then located on Hounsfield Test Equipment—450 KS, 50 KN UTM.

Compressive load was applied through the attachment on to the insert assembly.

The displacement of the attachment, lower face-plate, upper face-plate and the corresponding load were measured at loading rate of 0.25 mm/min.

Failure initiation of the insert assembly is obtained from sudden change in the load-displacement plot.

Experimental Results

Transverse displacement as a function of compressive load for through-the-thickness inserts is presented in FIGS. 6-8. For the same geometrical configurations and material properties (Tables 1 and 2), analytically obtained transverse displacement plots, compressive load at failure initiation and specific strength of inserts are presented in FIGS. 6-8 and Tables 3 and 4. The compressive loading was applied until the failure initiation took place.

Failure functions (equation 5) are plotted as a function of compressive load in FIG. 9. It is observed from Tables 3 and 4 that the compressive load at failure is higher for the case of 3D woven composite compared to the aluminum as insert material. The specific strength of insert is significantly higher for the case of 3D woven composite compared to the aluminum insert case. For the case of 2D woven composite insert, it is in between aluminum and 3D woven composite.

TABLE 1

Geometrical configuration of the insert assembly for the experimental studies.

| | Diameter, mm | | | | Thickness, mm | | |
|---|---|---|---|---|---|---|---|
| Configuration | Attachment, $D_a$ | Insert, $D_i$ | Potting material, $D_p$ | Support, $D_h$ | Upper plate, $t_1$ | Lower plate, $t_2$ | Core, c |
| 1 | 5 | 10 | 40 | 120 | 2 | 2 | 10 |

TABLE 2

Material properties of foam core sandwich structure with inserts: used for experimental studies.

| Material | Young's modulus, Ez (GPa) | Shear modulus, Grz (GPa) |
|---|---|---|
| aluminum | 70 | 27 |
| 2D woven composite | 6 | 2.5 |
| 3D woven composite | 10 | 4.5 |
| Epoxy resin | 2.5 | 0.93 |
| Foam core | 0.025 | 0.009 |
| Face-plate 1 | 10* | 4.2* |
| Face-plate 2 | 10* | 4.2* |

TABLE 3

Specific strength of through-the-thickness inserts with different materials: experimental studies.
Volume of insert, $V = 1.22 \times 10^{-6}\ m^3$
Density of aluminum = 2800 Kg/m$^3$
Density of 2D woven composite = 1700 Kg/m$^3$
Density of 3D woven composite = 1700 Kg/m$^3$

| Sr. No. | Insert | At failure initiation | | Mass of insert, m (Kg) | Specific strength of insert = (Max. Compressive load/weight of insert) | % increase in specific strength of insert | % decrease in mass of insert |
|---|---|---|---|---|---|---|---|
| | | Compressive load, Qc (N) | Displacement, w (mm) | | | | |
| 1 | Aluminum | 5610 | 5.9 | $3.416 \times 10^{-3}$ | $0.1642 \times 10^6$ | Reference | Reference |
| 2 | 2D woven composite | 5420 | 5.2 | $2.074 \times 10^{-3}$ | $0.2613 \times 10^6$ | 59.10 | 39.29 |
| 3 | 3D woven composite | 5695 | 7.7 | $2.074 \times 10^{-3}$ | $0.2746 \times 10^6$ | 67.23 | 39.29 |

TABLE 4

Specific strength of through-the-thickness inserts with different materials: analytical predictions for experimental configurations.
Volume of insert, $V = 1.22 \times 10^{-6}\ m^3$
3D woven composite insert: $Zt = 45$ MPa, $Srz = 36$ MPa
2D woven composite insert: $Zt = 27$ MPa, $Srz = 36$ MPa
Aluminum insert: $Zt = 150$ MPa, $Srz = 30$ MPa

| Sr. No. | Insert | At failure initiation | | Specific strength of insert = (Max. compressive load/weight of insert) | % increase in specific strength of insert | % decrease in mass of insert |
|---|---|---|---|---|---|---|
| | | Compressive load, Qc (N) | Displacement, w (mm) | | | |
| 1 | Aluminum | 6355 | 6.1 | $0.186 \times 10^6$ | Reference | Reference |
| 2 | 2D woven composite | 5950 | 5.4 | $0.287 \times 10^6$ | 54.30 | 39.29 |
| 3 | 3D woven composite | 7040 | 7.3 | $0.339 \times 10^6$ | 82.25 | 39.29 |

EXAMPLE 2

Comparison of Through-the-Thickness Inserts of Present Invention with Inserts of Prior Art Using the method of the present invention, compressive load at failure initiation, failure function and specific strength of inserts are mapped for the prior art disclosed in U.S. Pat. No. 5,053,285 (corrugated aluminum insert) and for the insert (3D woven composite insert) of the present invention with the same geometry as used for the prior art (R=30 mm). The results are given in FIG. 10 and Table 5. Further, the geometry of the insert of the present invention was modified (R=10 mm) to reduce the insert assembly weight. With such a modified configuration, compressive load at failure initiation, failure function and specific strength of inserts are mapped. From FIG. 10 and Table 5, it is established that the inserts of the present invention are having higher specific strength compared to the insert of prior art.

TABLE 5

Specific strength of through-the-thickness inserts with corrugated aluminum and 3D woven composite: analytical studies.
Density of Corrugated aluminum = 459 Kg/m$^3$
Density of 3D woven composites = 1700 Kg/m$^3$

| Insert | Compressive load at failure initiation, Qc (KN) | Mass of insert, m (Kg) | Specific strength of insert = (Max. compressive load/weight of insert) | % increase in specific strength of insert | % decrease in mass of insert |
|---|---|---|---|---|---|
| Corrugated aluminum | 8.27 | 0.038 | $21.62 \times 10^3$ | Reference | Reference |
| 3D woven composite with radius of 30 mm | 15.85 | 0.065 | $24.23 \times 10^3$ | 12.1 | −71.0 |
| 3D woven composite with radius of 10 mm | 14.08 | 0.0068 | $206.77 \times 10^3$ | 856.6 | 82.2 |

EXAMPLE 3

Analytical Studies with Different Insert Materials

Using the experimentally validated method for mapping of stresses, displacements and failure initiation, the results for aluminum, 2D woven composite, 3D thermoelastic isotropic woven composite, 3D woven composite, 3D woven composite with multiple inserts and 3D functionally gradient woven composite are obtained for the geometrical configuration of the insert assembly as given in Table 6. Material properties of the insert assembly are presented in Tables 7 and 8.

Maximum displacement, maximum normal stress and maximum shear stress corresponding to maximum compressive load at failure initiation are presented in Table 9. Specific strength of insert for different materials is also presented in Table 9. Failure function as a function of compressive load for different insert materials is presented in FIG. 11.

Percentage increase in specific strength of insert and percentage decrease in mass of insert for the composite inserts compared to the aluminum insert is presented in Table 9. It is observed that there is significant increase in specific strength and decrease in mass of insert for the composite inserts. The maximum gain is for the case of 3D functionally gradient woven composite inserts.

TABLE 6

Geometrical configuration of the insert assembly for the analytical studies.

| | Diameter, mm | | | | Thickness, mm | | |
|---|---|---|---|---|---|---|---|
| Con-figu-ration | Attach-ment, $D_a$ | Insert, $D_i$ | Potting material, $D_p$ | Sup-port, $D_h$ | Upper plate, $t_1$ | Lower plate, $t_2$ | Core, c |
| 1 | 10 | 20 | 50 | 120 | 2 | 2 | 10 |

TABLE 7

Material properties of the insert assembly.
Volume of insert, $V = 4.006 \times 10^{-6} \, m^3$
3D woven composite insert: Zt = 60 MPa, Srz = 36 MPa,
2D woven composite insert: Zt = 27 MPa, Srz = 36 MPa
Aluminum insert: Zt = 150 MPa, Srz = 30 MPa,
3D thermoelastic isotropic woven composite insert: Zt = 55 MPa,
Srz = 36 MPa
Epoxy: Zt = 38 MPa, Zc = 85 MPa, S = 42 MPa
3D woven composite with multiple inserts: Zt = 60 → 38 MPa,
Srz = 36 MPa
3D functionally gradient woven composite insert: Zt = 55 → 38 MPa,
Srz = 36 MPa

| Material | Young's modulus, $E_z$ (GPa) | Shear modulus, $G_{rz}$ (GPa) |
|---|---|---|
| Aluminum | 70 | 27 |
| 2D woven composite | 9 | 4 |
| 3D thermoelastic isotropic woven composite | 37.7 | 3.71 |
| 3D woven composite | 43 | 3.55 |
| Insert material 1 | 37.7 | 3.71 |
| Insert material 2 | 22.0 | 2.5 |
| Insert material 3 | 8 | 1.5 |
| 3D functionally gradient woven composite | 37.1-2.5 | 3.71-0.93 |
| Honeycomb | 0.310 | 0.138 |
| Epoxy resin | 2.5 | 0.93 |

TABLE 7-continued

Material properties of the insert assembly.
Volume of insert, $V = 4.006 \times 10^{-6} \, m^3$
3D woven composite insert: Zt = 60 MPa, Srz = 36 MPa,
2D woven composite insert: Zt = 27 MPa, Srz = 36 MPa
Aluminum insert: Zt = 150 MPa, Srz = 30 MPa,
3D thermoelastic isotropic woven composite insert: Zt = 55 MPa,
Srz = 36 MPa
Epoxy: Zt = 38 MPa, Zc = 85 MPa, S = 42 MPa
3D woven composite with multiple inserts: Zt = 60 → 38 MPa,
Srz = 36 MPa
3D functionally gradient woven composite insert: Zt = 55 → 38 MPa,
Srz = 36 MPa

| Material | Young's modulus, $E_z$ (GPa) | Shear modulus, $G_{rz}$ (GPa) |
|---|---|---|
| Face-plate 1 | 15* | 4.5* |
| Face-plate 2 | 15* | 4.5* |

*in-plane properties

Tables 2, 7 and 8 are based on the following references.

3D functionally gradient woven composite inserts are analyzed for the range of properties given in Table 7.

REFERENCES

1. Naik, N. K. and E. Sridevi. 2002. An analytical method for thermoelastic analysis of 3D orthogonal interlock woven composites, Journal of Reinforced Plastics and Composites, Vol. 21, pp. 1149-1191.
2. Naik N. K. et al. 2001. Stress and failure analysis of 3D orthogonal interlock woven composites, Journal of Reinforced Plastics and Composites, Vol. 20, pp. 1485-1523.
3. Naik, N. K. and V. K. Ganesh. 1996. Failure behavior of plain weave fabric laminates under on-axis uniaxial tensile loading: II—analytical predictions, Journal of Composite Materials, Vol. 30, pp. 1779-1822.
4. Shembekar, P. S. and N. K. Naik. 1992. Elastic behavior of woven fabric composites: II—laminate analysis, Journal of Composite Materials, Vol. 26, pp. 2226-2246.
5. Engineered Materials Handbook, Vol. 1, Composites, 1989, ASM International, Materials Park, Ohio.

TABLE 8

Elastic properties of orthotropic composite inserts (at θ = 0).

| | Young's modulus | | | Shear modulus | | | Poisson's ratio | | |
|---|---|---|---|---|---|---|---|---|---|
| Material | $E_r$ (GPa) | $E_\theta$ (GPa) | $E_z$ (GPa) | $G_{r\theta}$ (GPa) | $G_{rz}$ (GPa) | $G_{\theta z}$ (GPa) | $\nu_{r\theta}$ | $\nu_{rz}$ | $\nu_{\theta z}$ |
| 3D thermo-elastic iso-tropic woven com-posite | 37.1 | 37.5 | 37.7 | 3.71 | 3.71 | 3.71 | 0.111 | 0.106 | 0.106 |
| 3D woven com-posite | 46.7 | 16.4 | 43.1 | 3.57 | 3.55 | 3.55 | 0.088 | 0.222 | 0.225 |

TABLE 9

Specific strength of through-the-thickness inserts with different materials: analytical studies.
Volume of insert, $V = 4.006 \times 10^{-6}$ m$^3$
Density of Aluminum = 2800 Kg/m$^3$
Density of 2D and 3D woven composites = 1700 Kg/m$^3$
Density of 3D functionally gradient woven composite = 1700 → 1100 Kg/m$^3$

| Sr. No. | Insert | At failure initiation | | Mass of insert, m (Kg) $10^{-3}$ | Specific strength of insert = (Max. compressive load/ weight of insert) | % increase in specific strength of insert | % decrease in mass of insert |
|---|---|---|---|---|---|---|---|
| | | Compressive load, Qc (KN) | Displacement, w (mm) | | | | |
| 1 | Aluminum | 13.15 | 1.40 | 11.217 | $0.117 \times 10^6$ | Reference | Reference |
| 2 | 2D woven composite | 14.65 | 1.48 | 6.810 | $0.215 \times 10^6$ | 83.93 | 39.29 |
| 3 | 3D thermoelastic isotropic woven composite | 14.45 | 1.42 | 6.810 | $0.212 \times 10^6$ | 81.19 | 39.29 |
| 4 | 3D woven composite | 14.90 | 1.49 | 6.810 | $0.219 \times 10^6$ | 87.18 | 39.29 |
| 5 | 3D woven composite with multiple inserts | 15.90 | 1.32 | 6.009 | $0.265 \times 10^6$ | 126.50 | 46.43 |
| 6 | 3D functionally gradient woven composite | 16.35 | 1.62 | 5.176 | $0.316 \times 10^6$ | 170.09 | 53.86 |

It is evident from the examples that the novel method reliably maps the stresses, displacements and failure initiation and enables the judicious selection of the novel insert material and geometry to achieve higher specific strength.

The invention claimed is:

1. Insert assembly of high specific strength for sandwich structures comprising:
   (a) an arrangement of components including:
      i. an attachment;
      ii. a one-piece insert, which circumferentially surrounds the attachment;
      iii. potting material, which circumferentially surrounds the insert; and
      iv. a core, which circumferentially surrounds the potting material,
   (b) an upper face-plate located on an upper surface of the arrangement; and
   (c) a lower face-plate located on a lower surface of the arrangement,
   wherein the insert is a 3D woven composite that comprises a 3D preform and that is made using the 3D preform and resin transfer molding, wherein the 3D preform is a fully integrated continuous fiber assembly having multiaxial in-plane and out-of-plane fiber orientations, and reinforcement provided in through-the-thickness and planar directions, that is made using a 3D weaving process, wherein the 3D woven composite is selected from the group consisting of:
      3D thermoelastic isotropic woven composites wherein elastic and thermal properties are the same along all directions;
      3D orthogonal or angle interlock woven orthotropic composites;
      3D woven composites with multiple inserts, each insert having different elastic and strength properties;
      3D functionally gradient woven composites, which have gradually varying elastic and strength properties along a radial direction; and
   combinations thereof,
   wherein the insert assembly, which has high specific strength, has little or no stress concentration at interfaces between the attachment and the insert, between the insert and the potting material and between the potting material and the core.

2. Insert assembly of high specific strength for sandwich structures as claimed in claim 1, wherein the insert and the potting material extend throughout a thickness of the sandwich structure to form a through-the-thickness configuration.

3. Insert assembly of high specific strength for sandwich structures as claimed in claim 1, wherein the insert extends partially from the upper face-plate while the potting material extends throughout a thickness of the sandwich structure to form a fully potted configuration.

4. Insert assembly of high specific strength for sandwich structures as claimed in claim 1, wherein the insert and the potting material in the insert assembly extend partially from the upper face-plate throughout a thickness of the sandwich structure to form a partially potted configuration.

5. Insert assembly of high specific strength for sandwich structures as claimed in claim 1, wherein the insert is cylindrical in shape with integral or assembled flanges.

6. Insert assembly of high specific strength for sandwich structures as claimed in claim 1, wherein the potting material is a resin selected from the group consisting of epoxy, polyester, polyimide and combinations thereof.

7. Insert assembly of high specific strength for sandwich structures as claimed in claim 1, wherein the upper face-plate is prepared from a material with density of 1700-7800 Kg/m$^3$, Young's modulus of 5-200 GPa, Shear modulus of 2-77 GPa and Poisson's ratio of 0.108-0.35.

8. Insert assembly of high specific strength for sandwich structures as claimed in claim 1, wherein the lower face-plate is prepared from a material with density of 1700-7800 Kg/m$^3$, Young's modulus of 5-200 GPa, Shear modulus of 2-77 GPa and Poisson's ratio of 0.108-0.35.

9. Insert assembly of high specific strength for sandwich structures as claimed in claim 1, wherein the upper face-plate has a flat profile.

10. Insert assembly of high specific strength for sandwich structures as claimed in claim 1, wherein the lower face-plate has a flat profile.

11. Insert assembly of high specific strength for sandwich structures as claimed in claim 1, wherein a specific strength of the insert is enhanced by about 200% with respect to aluminum and about 500% with respect to other metals.

12. Insert assembly of high specific strength for sandwich structures as claimed in claim 1, wherein the upper face-plate is prepared from materials selected from the group consisting of aluminum, aluminum alloys and fiber reinforced plastic composites.

13. Insert assembly of high specific strength for sandwich structures as claimed in claim 1, wherein the lower face-plate is prepared from materials selected from the group consisting of aluminum, aluminum alloys and fiber reinforced plastic composites.

14. Insert assembly of high specific strength for sandwich structures as claimed in claim 1, wherein the one-piece insert is a rigid insert.

15. Insert assembly of high specific strength for sandwich structures as claimed in claim 1, wherein the 3D woven composite is a 3D orthotropic and macroscopically homogeneous material.

16. Insert assembly of high specific strength for sandwich structures as claimed in claim 15, wherein the 3D orthotropic and macroscopically homogeneous material is characterized by nine elastic properties and nine strength properties.

17. Insert assembly of high specific strength for sandwich structures as claimed in claim 1, wherein the 3D woven composite is a 3D thermoelastic isotropic woven composite wherein elastic and thermal properties are the same along all directions.

18. Insert assembly of high specific strength for sandwich structures as claimed in claim 17, wherein the 3D thermoelastic isotropic woven composites are 3D thermoelastic isotropic orthogonal or angle interlock woven composites.

19. Insert assembly of high specific strength for sandwich structures as claimed in claim 1, wherein the 3D woven composite is a 3D orthogonal or angle interlock woven orthotropic composite.

20. Insert assembly of high specific strength for sandwich structures as claimed in claim 19, wherein the 3D orthogonal or angle interlock woven composites are rigid composites having 3D orthotropicity.

21. Insert assembly of high specific strength for sandwich structures as claimed in claim 1, wherein the 3D woven composite is a 3D woven composite with multiple inserts, each insert having different elastic and strength properties.

22. Insert assembly of high specific strength for sandwich structures as claimed in claim 21, wherein the 3D woven composites with multiple inserts are 3D orthogonal or angle interlock woven composites with multiple inserts.

23. Insert assembly of high specific strength for sandwich structures as claimed in claim 1, wherein the 3D woven composite is a 3D functionally gradient woven composite, which has gradually varying elastic and strength properties along a radial direction.

24. Insert assembly of high specific strength for sandwich structures as claimed in claim 23, wherein the 3D functionally gradient woven composites are 3D functionally gradient orthogonal or angle interlock woven composites.

25. Insert assembly of high specific strength for sandwich structures comprising:
(a) an arrangement of components including:
i. an attachment;
ii. a one-piece insert, which circumferentially surrounds the attachment;
iii. potting material, which circumferentially surrounds the insert; and
iv. a core, which circumferentially surrounds the potting material,
(b) an upper face-plate located on an upper surface of the arrangement; and
(c) a lower face-plate located on a lower surface of the arrangement,
wherein the insert is a 3D woven composite that comprises a 3D preform and that is made using the 3D preform and resin transfer molding, wherein the 3D preform is a fully integrated continuous fiber assembly having multiaxial in-plane and out-of-plane fiber orientations, and reinforcement provided in through-the-thickness and planar directions, wherein the 3D woven composite is selected from the group consisting of:
3D thermoelastic isotropic woven composites wherein elastic and thermal properties are the same along all directions;
3D orthogonal or angle interlock woven orthotropic composites;
3D woven composites with multiple inserts, each insert having different elastic and strength properties;
3D functionally gradient woven composites, which have gradually varying elastic and strength properties along a radial direction; and
combinations thereof,
wherein geometrical configurations of the insert assembly and materials used to prepare the insert assembly are selected based on mapping stress distribution and obtaining failure initiation, and
wherein the insert and the potting material extend throughout a thickness of the sandwich structure to form a through-the-thickness configuration.

26. Insert assembly of high specific strength for sandwich structures comprising:
(a) an arrangement of components including:
i. an attachment;
ii. a one-piece insert, which circumferentially surrounds the attachment;
iii. potting material, which circumferentially surrounds the insert; and
iv. a core, which circumferentially surrounds the potting material,
(b) an upper face-plate located on an upper surface of the arrangement; and
(c) a lower face-plate located on a lower surface of the arrangement,
wherein the insert is a 3D woven composite that comprises a 3D preform and that is made using the 3D preform and resin transfer molding, wherein the 3D preform is a fully integrated continuous fiber assembly having multiaxial in-plane and out-of-plane fiber orientations, and reinforcement provided in through-the-thickness and planar directions, wherein the 3D woven composite is selected from the group consisting of:
3D thermoelastic isotropic woven composites wherein elastic and thermal properties are the same along all directions;
3D orthogonal or angle interlock woven orthotropic composites;
3D woven composites with multiple inserts, each insert having different elastic and strength properties;
3D functionally gradient woven composites, which have gradually varying elastic and strength properties along a radial direction; and
combinations thereof,
wherein geometrical configurations of the insert assembly and materials used to prepare the insert assembly are selected based on mapping stress distribution and obtaining failure initiation, and wherein the insert extends partially from the upper face-plate while the potting material extends throughout a thickness of the sandwich structure to form a fully potted configuration.

27. Insert assembly of high specific strength for sandwich structures comprising:
   (a) an arrangement of components including:
      i. an attachment;
      ii. a one-piece insert, which circumferentially surrounds the attachment;
      iii. potting material, which circumferentially surrounds the insert; and
      iv. a core, which circumferentially surrounds the potting material,
   (b) an upper face-plate located on an upper surface of the arrangement; and
   (c) a lower face-plate located on a lower surface of the arrangement,
   wherein the insert is a 3D woven composite that comprises a 3D preform and that is made using the 3D preform and resin transfer molding, wherein the 3D preform is a fully integrated continuous fiber assembly having multiaxial in-plane and out-of-plane fiber orientations, and reinforcement provided in through-the-thickness and planar directions, wherein the 3D woven composite is selected from the group consisting of:
      3D thermoelastic isotropic woven composites wherein elastic and thermal properties are the same along all directions;
      3D orthogonal or angle interlock woven orthotropic composites;
      3D woven composites with multiple inserts, each insert having different elastic and strength properties;
      3D functionally gradient woven composites, which have gradually varying elastic and strength properties along a radial direction; and
   combinations thereof,
   wherein geometrical configurations of the insert assembly and materials used to prepare the insert assembly are selected based on mapping stress distribution and obtaining failure initiation, and
   wherein the insert and the potting material in the insert assembly extend partially from the upper face-plate throughout a thickness of the sandwich structure to form a partially potted configuration.

* * * * *

UNITED STATES PATENT AND TRADEMARK OFFICE
CERTIFICATE OF CORRECTION

PATENT NO. : 8,640,428 B2
APPLICATION NO. : 11/628072
DATED : February 4, 2014
INVENTOR(S) : Niranjan Krishna Naik et al.

It is certified that error appears in the above-identified patent and that said Letters Patent is hereby corrected as shown below:

Title page, Item (73), under Assignees, "Indian Institute of Technology, Bombay, Mumbai (IN)" should be replaced by "Indian Institute of Technology Bombay, Mumbai (IN)";

Title page, Item (57), in the Abstract, line 6, "Upper" should be replaced by "upper";

In the Specification

Column 5, line 52, "performs" should be "preforms";

Column 6, line 61, " $(u_{01}{}^1)$ " should be " $(u_{01}^1)$ ";

Column 6, line 62, " $(v_{01}{}^1)$ " should be " $(v_{01}^1)$ "; and

Column 7, line 36, " $r_\theta v_{0\theta}^1 + \frac{\partial w^1}{\partial r}\left(\frac{1}{2r}\right)\left(r_1 - \frac{z^2}{c} - z + \frac{3c}{4}\right) +$ "

should be " $v_\theta = v_{0\theta}^1 + \frac{\partial w^1}{\partial r}\left(\frac{1}{2r}\right)\left(\eta - \frac{z^2}{c} - z + \frac{3c}{4}\right) +$ ".

Signed and Sealed this
Fifteenth Day of July, 2014

Michelle K. Lee
*Deputy Director of the United States Patent and Trademark Office*